(12) United States Patent
Beattie, Jr. et al.

(10) Patent No.: US 8,108,720 B2
(45) Date of Patent: Jan. 31, 2012

(54) METHODS, SYSTEMS AND PRODUCTS FOR DETECTING FAILING POWER SUPPLIES

(75) Inventors: James Gordon Beattie, Jr., Bergenfield, NJ (US); Paritosh Bajpay, Edison, NJ (US); Stephen J. Griesmer, Westfield, NJ (US); Martin Tusl, Velke Popovice (CZ)

(73) Assignee: AT&T Intellectual Property I, L.P., Atlanta, GA (US)

( * ) Notice: Subject to any disclaimer, the term of this patent is extended or adjusted under 35 U.S.C. 154(b) by 207 days.

(21) Appl. No.: 12/567,821

(22) Filed: Sep. 28, 2009

(65) Prior Publication Data

US 2011/0078513 A1    Mar. 31, 2011

(51) Int. Cl.
*G06F 11/00*    (2006.01)
(52) U.S. Cl. ............................................ 714/14; 714/22
(58) Field of Classification Search ................... 714/14, 714/22
See application file for complete search history.

(56) References Cited

U.S. PATENT DOCUMENTS

| | | | |
|---|---|---|---|
| 4,866,635 A | 9/1989 | Kahn et al. | |
| 5,675,480 A * | 10/1997 | Stanford | 307/58 |
| 5,699,502 A | 12/1997 | Swanberg et al. | |
| 5,712,779 A | 1/1998 | Sheppard et al. | |
| 5,745,041 A * | 4/1998 | Moss | 340/635 |
| 5,935,260 A | 8/1999 | Ofer | |
| 6,060,879 A * | 5/2000 | Mussenden | 324/76.39 |
| 6,225,911 B1 | 5/2001 | Nagamasa et al. | |
| 6,298,449 B1 * | 10/2001 | Carter | 713/340 |
| 7,409,594 B2 | 8/2008 | Mukherjee et al. | |
| 2003/0095366 A1 | 5/2003 | Pellegrino | |
| 2005/0283635 A1 | 12/2005 | Benson et al. | |
| 2006/0129367 A1 | 6/2006 | Mishra et al. | |
| 2006/0176186 A1 * | 8/2006 | Larson et al. | 340/635 |
| 2007/0055914 A1 * | 3/2007 | Chandwani et al. | 714/47 |
| 2007/0088974 A1 * | 4/2007 | Chandwani et al. | 714/6 |
| 2007/0150236 A1 * | 6/2007 | Warizaya | 702/184 |
| 2008/0256398 A1 | 10/2008 | Gross et al. | |
| 2009/0089604 A1 * | 4/2009 | Malik et al. | 713/340 |
| 2009/0125757 A1 * | 5/2009 | Knorl et al. | 714/47 |

* cited by examiner

*Primary Examiner* — Bryce Bonzo
(74) *Attorney, Agent, or Firm* — Scott P. Zimmerman PLLC

(57) ABSTRACT

Methods, systems, and products are disclosed for predicting failures in power supplies. A count of exception messages is set to zero. When a exception message is received, the count of exception messages is incremented and compared to a threshold value. When the count of exception messages equals the threshold value, a cooling fan is determined to be failed, and a prediction is made that a power supply is proceeding towards failure.

20 Claims, 11 Drawing Sheets

FIG. 5

| | | | |
|---|---|---|---|
| LONBGBD3 | 11/08/2005 11 | 29 | 49 CST Sf#1 DC Voltage Unit {Chassis DC Level Above Normal-60034} DC Voltage Above Normal |
| LONBGBD3 | 11/08/2005 11 | 30 | 03 CST Sf#1 DC Voltage Unit {Chassis DC Level Below Normal-60029} DC Voltage Below Normal |
| LONBGBD3 | 11/08/2005 11 | 30 | 23 CST Sf#1 DC Voltage Unit {Chassis DC Level Normal-60028} DC Voltage Normal |
| LONBGBD3 | 11/17/2005 03 | 39 | 02 CST Sf#1 DC Voltage Unit {Chassis DC Level Below Normal-60029} DC Voltage Below Normal |
| LONBGBD3 | 11/17/2005 03 | 39 | 17 CST Sf#1 DC Voltage Unit {Chassis DC Level Normal-60028} DC Voltage Normal |
| LONBGBD3 | 11/23/2005 02 | 18 | 51 CST Sf#1 DC Voltage Unit {Chassis DC Level Below Normal-60029} DC Voltage Below Normal |
| LONBGBD3 | 11/23/2005 02 | 19 | 06 CST Sf#1 DC Voltage Unit {Chassis DC Level Normal-60028} DC Voltage Normal |
| LONBGBD3 | 11/23/2005 03 | 33 | 31 CST Sf#1 DC Voltage Unit {Chassis DC Level Below Normal-60029} DC Voltage Below Normal |
| LONBGBD3 | 11/23/2005 03 | 33 | 46 CST Sf#1 DC Voltage Unit {Chassis DC Level Normal-60028} DC Voltage Normal |
| LONBGBD3 | 11/23/2005 03 | 50 | 41 CST Sf#1 DC Voltage Unit {Chassis DC Level Below Normal-60029} DC Voltage Below Normal |
| LONBGBD3 | 11/23/2005 03 | 50 | 56 CST Sf#1 DC Voltage Unit {Chassis DC Level Normal-60028} DC Voltage Normal |
| LONBGBD3 | 12/13/2005 17 | 49 | 43 CST Sf#1 DC Voltage Unit {Chassis DC Level Below Normal-60029} DC Voltage Below Normal |
| LONBGBD3 | 12/13/2005 17 | 50 | 18 CST Sf#1 DC Voltage Unit {Chassis DC Level Normal-60028} DC Voltage Normal |
| LONBGBD3 | 12/13/2005 17 | 59 | 53 CST Sf#1 DC Voltage Unit {Chassis DC Level Below Normal-60029} DC Voltage Below Normal |
| LONBGBD3 | 12/13/2005 18 | 0 | 08 CST Sf#1 DC Voltage Unit {Chassis DC Level Normal-60028} DC Voltage Normal |
| LONBGBD3 | 12/13/2005 18 | 9 | 26 CST Sf#1 Power Supply Unit {Chassis Power Supply Failed-60031} Power Supply Failed |
| LONBGBD3 | 12/13/2005 18 | 9 | 33 CST Sf#1 DC Voltage Unit {Chassis DC Level Below Normal-60029} DC Voltage Below Normal |
| LONBGBD3 | 12/13/2005 18 | 9 | 36 CST Sf#1 Power Supply Unit {Chassis Power Supply Normal-60030} Power Supply Normal |
| LONBGBD3 | 12/13/2005 18 | 9 | 48 CST Sf#1 DC Voltage Unit {Chassis DC Level Normal-60028} DC Voltage Normal |

METHODS, SYSTEMS AND PRODUCTS FOR DETECTING FAILING POWER SUPPLIES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

Exemplary embodiments generally relate to communications, to electrical computers, and to electrical transmission and, more particularly, to a condition of electrical apparatuses, to power source monitoring, to switching systems, and to error/fault handling.

Power supplies sometimes fail. A power supply provides electrical power to electrical components. When the power supply fails, the power supply stops providing voltage and current to the electrical components. A failure of a power supply is especially catastrophic in communications networks. When the power supply fails, network equipment shuts down, disrupting communications for thousands of customers. Network providers thus embrace concepts that reduce the disruption caused by failing power supplies.

SUMMARY

Exemplary embodiments provide methods, systems, apparatuses, and products for predicting failures in power supplies. Exemplary embodiments predict when a power supply is beginning to fail, so that repairs may be made before the power supply actually fails. Exemplary embodiments monitor voltage perturbations in the electrical power produced by the power supply. When a voltage perturbation is observed that is outside an acceptable range of voltages, exemplary embodiments infer that the power supply is beginning to fail. The power supply may then be replaced before a catastrophic failure occurs.

Exemplary embodiments may monitor exception messages. A power supply usually provide electrical voltage and/or current to various components. These components may generate error messages (or exception messages) when the voltage is outside an acceptable range of voltages. Exemplary embodiments may infer, from a single exception message, that the power supply is failing. Exemplary embodiments may thus report warnings and generate work orders to replace the power supply an actual failure disrupts service.

Exemplary embodiments includes methods for predicting failures in power supplies. A count of voltage exception messages is set to zero. When a voltage exception message is received, the count of voltage exception messages is incremented and compared to a threshold value. When the count of voltage exception messages equals the threshold value, a cooling fan is determined to be failed, and a prediction is made that a power supply is proceeding towards failure.

Exemplary embodiments also include a system for predicting failures. A time period is established during which voltage exception messages are monitored. A voltage exception message is received that indicates a voltage associated with a power supply in a switch is high or low. A count of voltage exception messages is set to zero at a start of the time period. A total number of voltage exception messages is set to zero at the start of the time period. The count of voltage exception messages is incremented and compared to a threshold value when a voltage exception message is received during the time period. When the count of voltage exception messages equals the threshold value, a determination is made that a cooling fan has failed and a prediction is made that a power supply is proceeding toward failure. The total number of voltage exception messages is reported when the time period expires.

More exemplary embodiments include a computer readable storage medium that stores processor-executable instructions for performing a method of predicting failures in a power supply. A time period is established during which voltage exception messages are monitored. A voltage exception message is received that indicates a voltage associated with the power supply is high or low in a switch. A count of voltage exception messages is set at zero at a start of the time period, and a total number of voltage exception messages is set to zero at the start of the time period. When a voltage exception message is received during the time period, the count of voltage exception messages is incremented and compared to a threshold value. When the count of voltage exception messages equals the threshold value, a determination is made that a cooling fan has failed and a prediction is made that a power supply is proceeding toward failure. The total number of voltage exception messages is reported when the time period expires.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 4 and 5 are schematics illustrating trap messages produced by communications switches, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
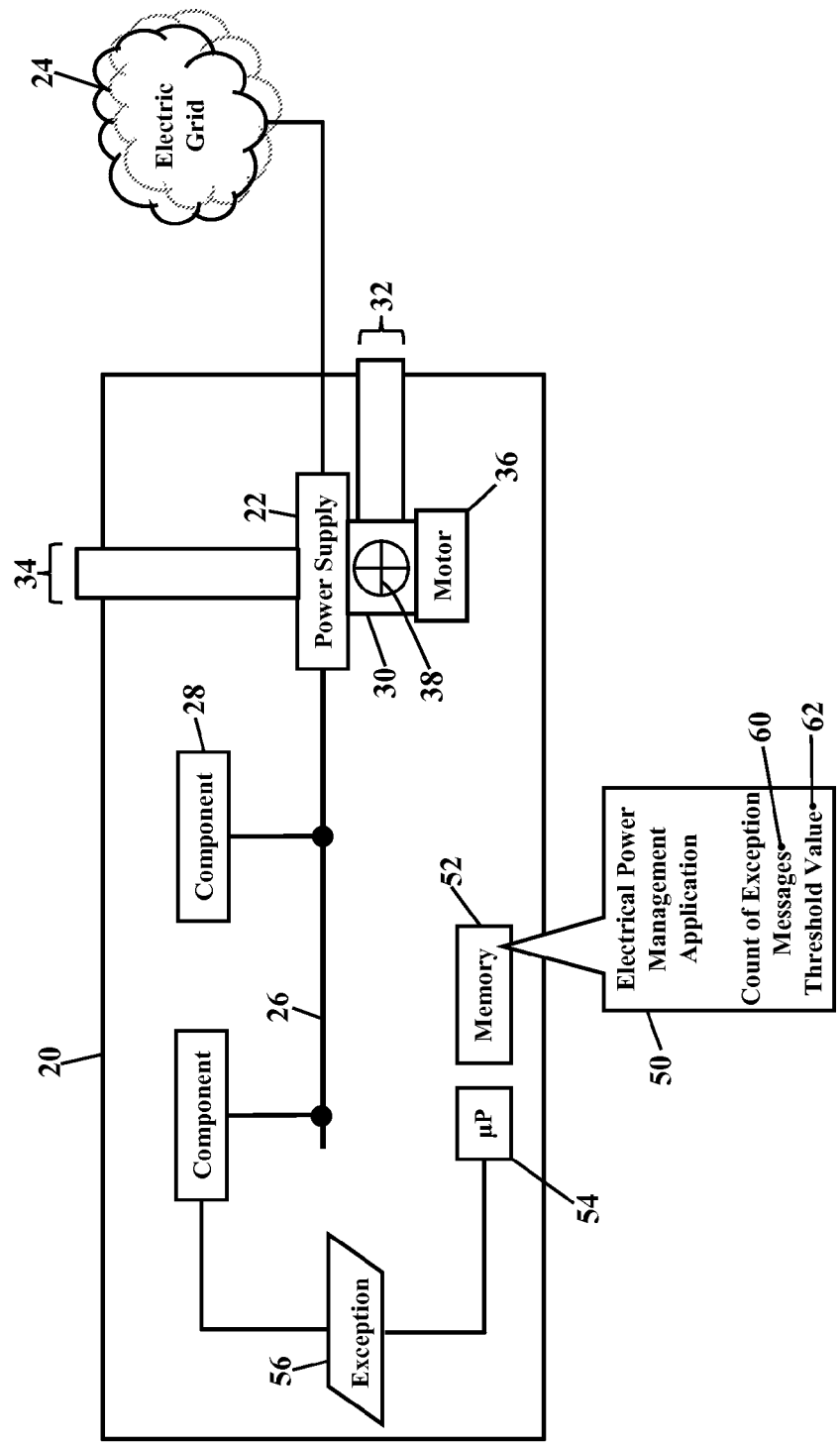
FIG. 1 is a simplified schematic illustrating a system that predicts failures in power supplies, according to exemplary embodiments.

FIG. 1 is a simplified schematic illustrating a system that predicts failures in power supplies, according to exemplary embodiments. FIG. 1 illustrates a system 20 having a power supply 22. The power supply 22 receives electrical power from an electric grid 24 and supplies electrical power to a bus 26. Various components 28 of the system 20 tap electrical power from the bus 26. The power supply 22, for example, may receive alternating current ("AC") electrical power from the electric grid 24 (or some other a power source, such as a generator) and converts, or "rectifies," the AC electrical power into direct current ("DC") electrical power at a different voltage. The power supply 22 may also receive DC electrical power and output AC electrical power. Regardless, the power supply 22 may generate heat, so a cooling fan 30 is used to prevent overheating. The cooling fan 30 moves cooling air from a plenum inlet 32, over and around the power supply 22, to a plenum outlet 34. The cooling fan 30 has a motor 36, fan blades 38, and a support structure (not shown for simplicity).

The system 20 may be processor-controlled. As FIG. 1 illustrates, the system 20 may store and execute a failure prediction application 50. The failure prediction application 50 may be stored in memory 52, and a processor 54 may communicate with the memory 52 and execute the failure prediction application 50. The failure prediction application 50 may receive exception messages 56 from the components 28 of the system 20. Each exception message 56 may indicate that an expected voltage is outside a range of acceptable voltages. That is, the expected voltage tapped from the bus 26 is low compared to a minimum-acceptable voltage, and/or the expected voltage is high compared to a maximum-permissible voltage. The processor 54 receives these exception messages 56, and the failure prediction application 50 causes the processor 54 to predict when the power supply 22 is in the process of failing.

The system 20 may count the exception messages 56. The failure prediction application 50 may establish a count 60 of exception messages in the memory 52. The failure prediction application 50 may initially set the count 60 of exception messages to zero (0). When an exception message 56 is received, the failure prediction application 50 increments the count 60 of exception messages and compares the count 60 of exception messages to a threshold value 62. When the count 60 of exception messages equals the threshold value 62, the failure prediction application 50 may infer that the cooling fan 30 has failed. Because the cooling fan 30 has failed, the failure prediction application 50 may also predict that the power supply 22 is proceeding toward failure.

Figure 2:
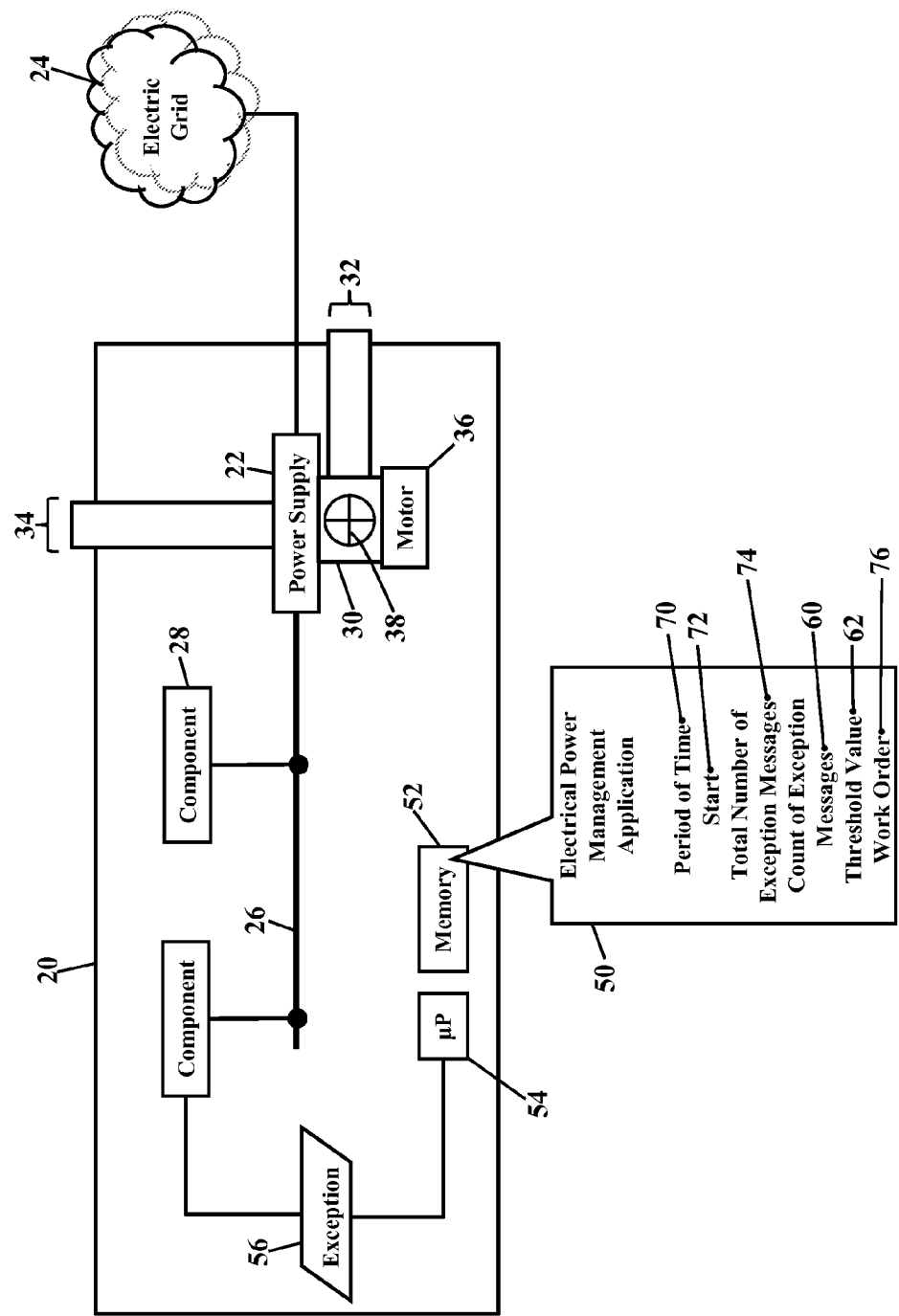
FIGS. 2 and 3 are more detailed schematics illustrating the prediction of failures in power supplies, according to exemplary embodiments.

FIG. 2 is a more detailed schematic illustrating the prediction of failures in power supplies, according to exemplary embodiments. Here the failure prediction application 50 monitors the exception messages 56 over a period 70 of time. The failure prediction application 50 sets the count 60 of exception messages at zero (0) at a start 72 of the time period and sets a total number 74 of exception messages at zero (0) at the start of the period 70 of time. The voltage exception message 56 is received during the period 70 of time that indicates any of the components 28 has detected a high or low voltage condition. The count 60 of exception messages is incremented and the total number 74 of exception messages is also incremented. The count 60 of exception messages is compared to the threshold value 62. When the count 60 of exception messages equals the threshold value 62, the cooling fan 30 is determined to have failed and the power supply 22 is predicted to be failing. The failure prediction application 50 may generate work orders 76 to replace the cooling fan 30 and/or the power supply 22.

Figure 3:
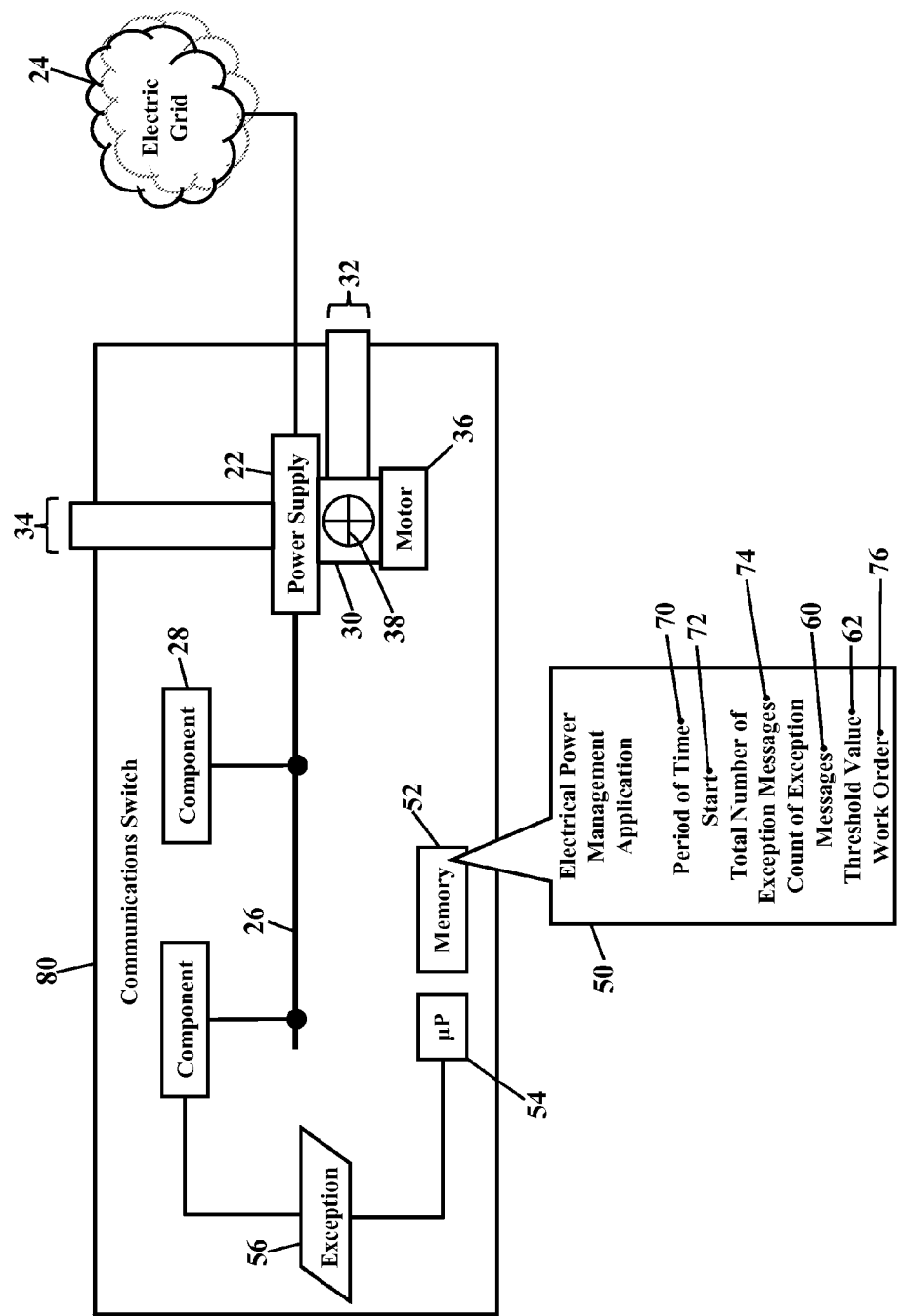

FIG. 3 is an even more detailed schematic illustrating the prediction of failures in power supplies, according to exemplary embodiments. Here the failure prediction application 50 monitors the exception messages 56 produced by the components 28 of a communications switch 80 (such as the CISCO® MGX family of switches). The communications switch 80 may be an at-risk node in a communications network, due to the undetected, degraded performance of the power supply 22. Even though the communications switch 80 may have impressive processing capabilities, the internal power supply 22 may not be instrumented in any way which would indicate a degradation or failure of the cooling fan 30. Here, then, when the cooling fan 30 is failing, or has failed, the power supply 22 may be unable to produce the electrical power that is needed to adequately support the electrical load of the components 28 (such as electrical cards or blades) in the communications switch 80. Because the cooling fan 30 has failed, the power supply 22 may prematurely fail, resulting in a catastrophic failure of the communications switch 80.

Exemplary embodiments may thus predict failures. A predictive signature has been observed that provides a high confidence of an improperly performing or failed cooling fan 30. This signature is based on the observation that when the cooling action of the cooling fan 30 is degraded or failed, one or more exception messages 56 (e.g., voltage exception traps) are sent from the components 28 of the communications switch 80. If multiple exception messages 56 occur in a thirty-day period, for example, then the failure prediction application 50 may assume, with high confidence, that the cooling fan 30 is faulty and that the power supply 22 is in the process of failing. When the voltage exception message 56 is received, the count 60 of exception messages is incremented and the total number 74 of exception messages is also incremented. The count 60 of exception messages is compared to the threshold value 62. Here the threshold value 62 is may be set to a single (1) occurrence during the thirty-day period. When the count 60 of exception messages equals the threshold value 62 of one (1) occurrence, the failure prediction application 50 determines that the cooling fan 30 has failed and predicts that the power supply 22 is failing. The inventors have observed, with good confidence, that a single exception message 56 during the thirty-day period indicates that the cooling fan 30 has failed and that the power supply 22 may soon fail.

Figure 4:
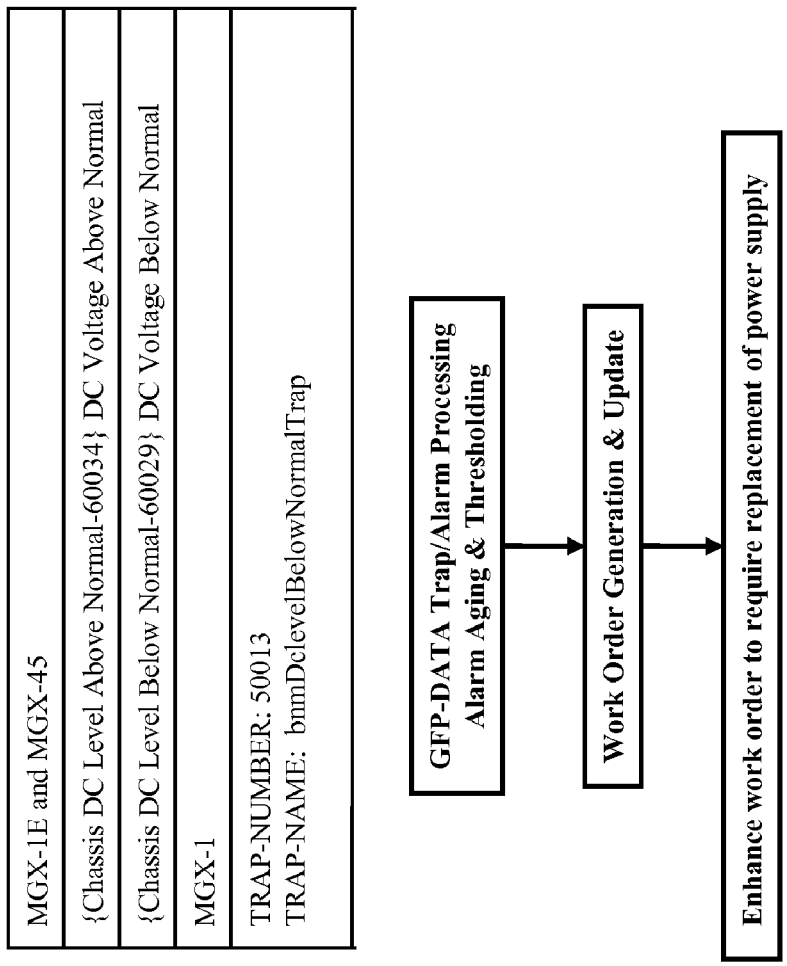

FIGS. 4 and 5 are schematics illustrating trap messages produced by the CISCO® MGX family of communications switches, according to exemplary embodiments. FIG. 4 illustrates the predictive signature of two (2) voltage exception messages produced by a CISCO® communications switch over a 30-day period of time. FIG. 5 illustrates a listing of multiple voltage exceptions, or traps, for a particular communications switch 80. FIGS. 4 and 5 illustrate that when an AC power supply is operating in a degraded state (or has a companion power supply operating in a degraded or failed state), the CISCO® MGX switch will transmit trap messages indicating low or high voltage threshold exceptions. One or more trap messages within a thirty day monthly period, for example, has been inferred to indicate one or more of the AC power supplies on the communications switch's bus will be operating with some failed or failing components. Elevated temperatures result in voltage fluctuations and the transmission of the voltage exception traps. The monitoring of the voltage exception traps or alarms over time alleviates the functional gaps in the switch's monitoring logic. Exemplary embodiments thus help avoid a catastrophic failure of a communications switch by identifying the bad power supply 22 in a timely manner. Exemplary embodiments also reduce exposure to a loss of revenue when the communications switch 80 is operationally down. Moreover, network reliability is enhanced to provide reliability and stability for customers.

Even momentary fluctuations may indicate a failure of the power supply 22. The CISCO® MGX switch may issue voltage exceptions for momentary fluctuations in voltage on a bus. The monitoring logic, however, ignores these momentary fluctuations in voltage. That is, the CISCO® MGX switch may only flag an actual error in the power supply 22 when a hard or confirmed failure is detected. Because the monitoring logic ignores voltage exceptions due to momentary fluctuations in voltage, the monitoring logic fails to subtle changes and degradations in the performance of the cooling fan 30. If the power supply 22 has not been altered or modified, then the voltage exceptions may be used to predict a failure in the cooling fan 30.

Figure 6:
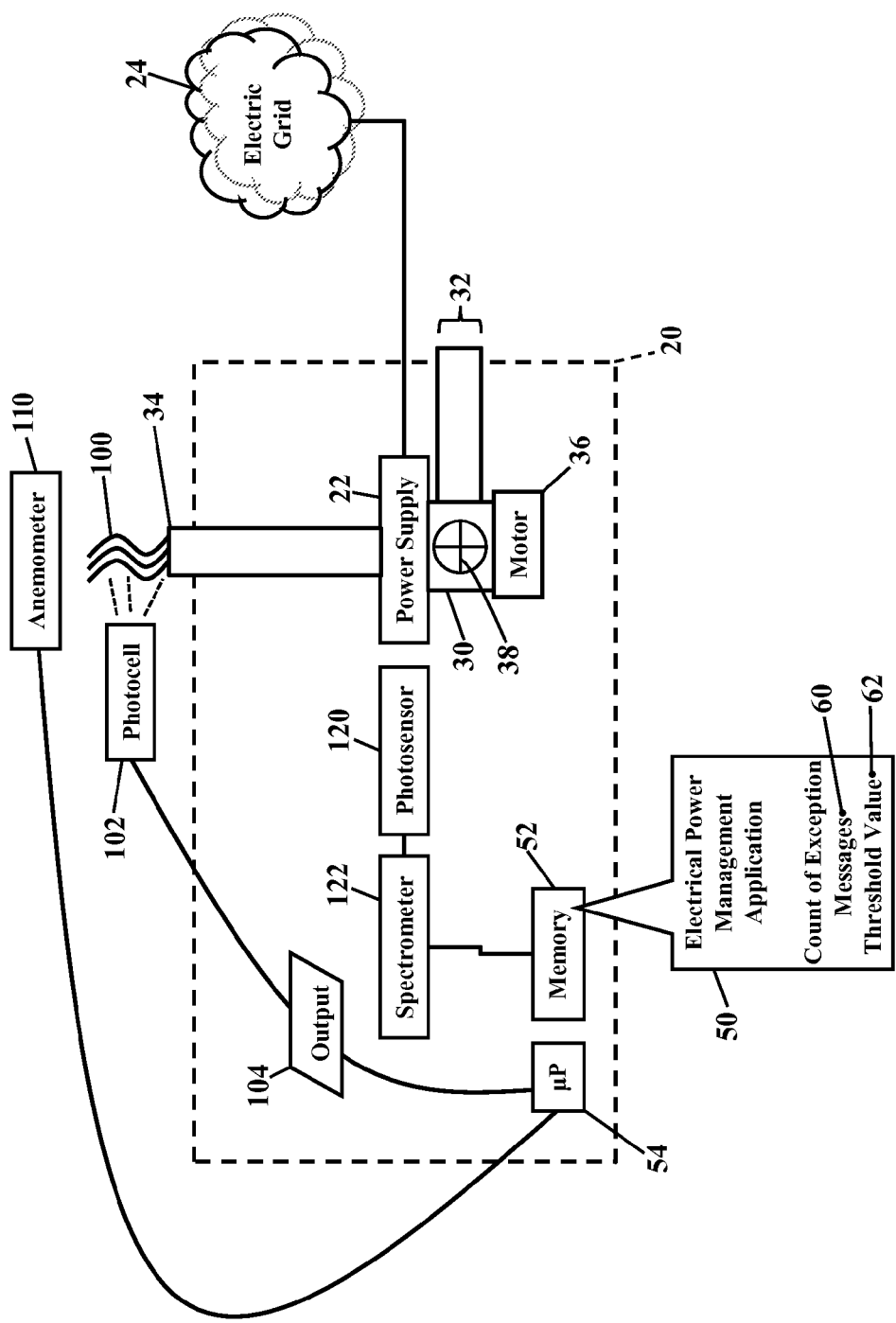
FIG. 6 is another more detailed schematic illustrating the prediction of failures in power supplies, according to exemplary embodiments.

FIG. 6 is another more detailed schematic illustrating the prediction of failures in power supplies, according to exemplary embodiments. Here the failure prediction application 50 may receive additional information to improve confidence levels. The air outlet 34, for example, may include streamers 100. A photocell 102 produces an output signal 104 that is received by the failure prediction application 50. When the cooling fan 30 properly operates, the streamers 100 will be blown by exhausting air flow and at least intermittently block an eye of the photocell 102. When the cooling fan 30 slows or fails, the streamers 100 become limp and the photocell 102 is unblocked. When the failure prediction application 50 receives a constant output signal from the photocell 102, the failure prediction application 50 may infer that the cooling fan 30 has failed. The failure prediction application 50 may additionally or alternatively receive a signal produced by an anemometer 110. When the failure prediction application 50 receives a zero or low output signal from the anemometer 110, the failure prediction application 50 may infer that the cooling fan 30 has failed and predict that the power supply 22 is failing. A photosensor 120 may receive an optical input of the power supply 22, and a spectrometer 122 measures an intensity of the optical input. As the power supply 22 heats due to inadequate cooling action, the intensity of the optical input may change (e.g., changes in wavelength and/or photon energy). The failure prediction application 50 may infer that the cooling fan 30 has failed and predict that the power supply 22 is failing.

Figure 7:
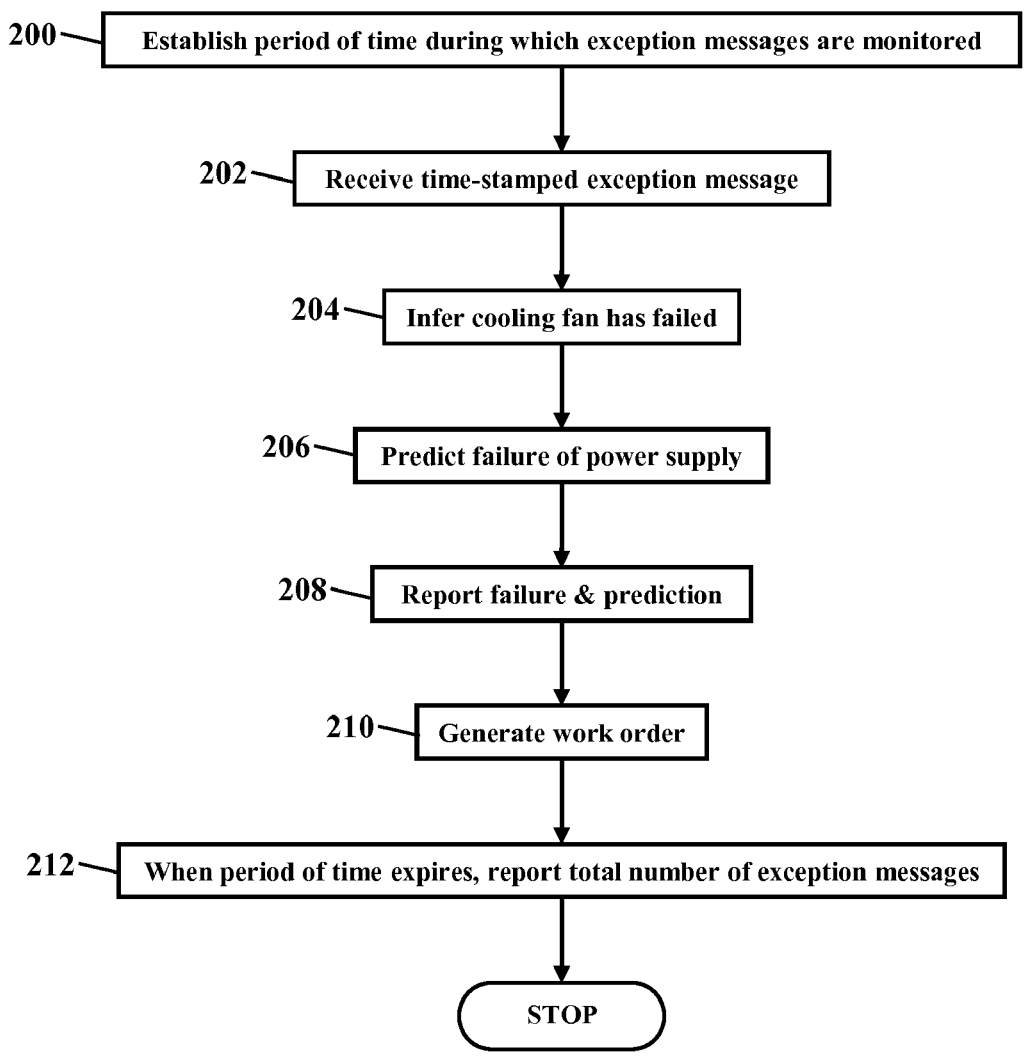
FIGS. 7-11 are flowcharts illustrating a method of predicting failures in power supplies, according to exemplary embodiments.

FIG. 7 is a flowchart illustrating a method of predicting failures in power supplies, according to exemplary embodiments. A period of time is established during which exception messages are monitored (Block 200). A time-stamped exception message is received that indicates a voltage on a bus is high or low (Block 202). An inference is made from the exception message that a cooling fan has failed (Block 204). A prediction is made that a power supply is proceeding toward failure (Block 206). The failure of the cooling fan and/or the prediction is reported (Block 208). A work order may be generated to replace the power supply and/or the cooling fan (Block 210). When the period of time expires, the total number of exception messages is reported (Block 212).

Figure 8:
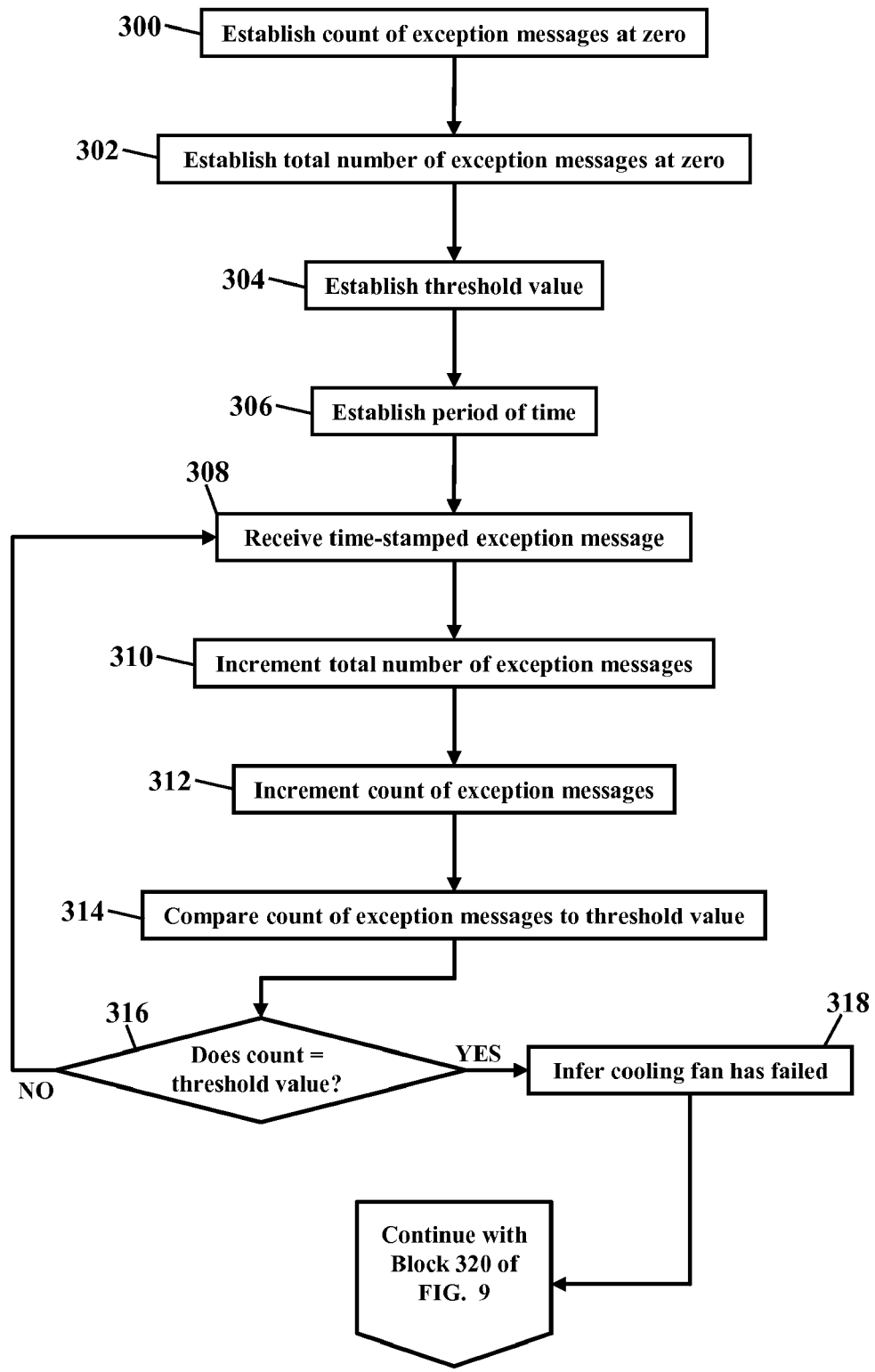
Figure 9:
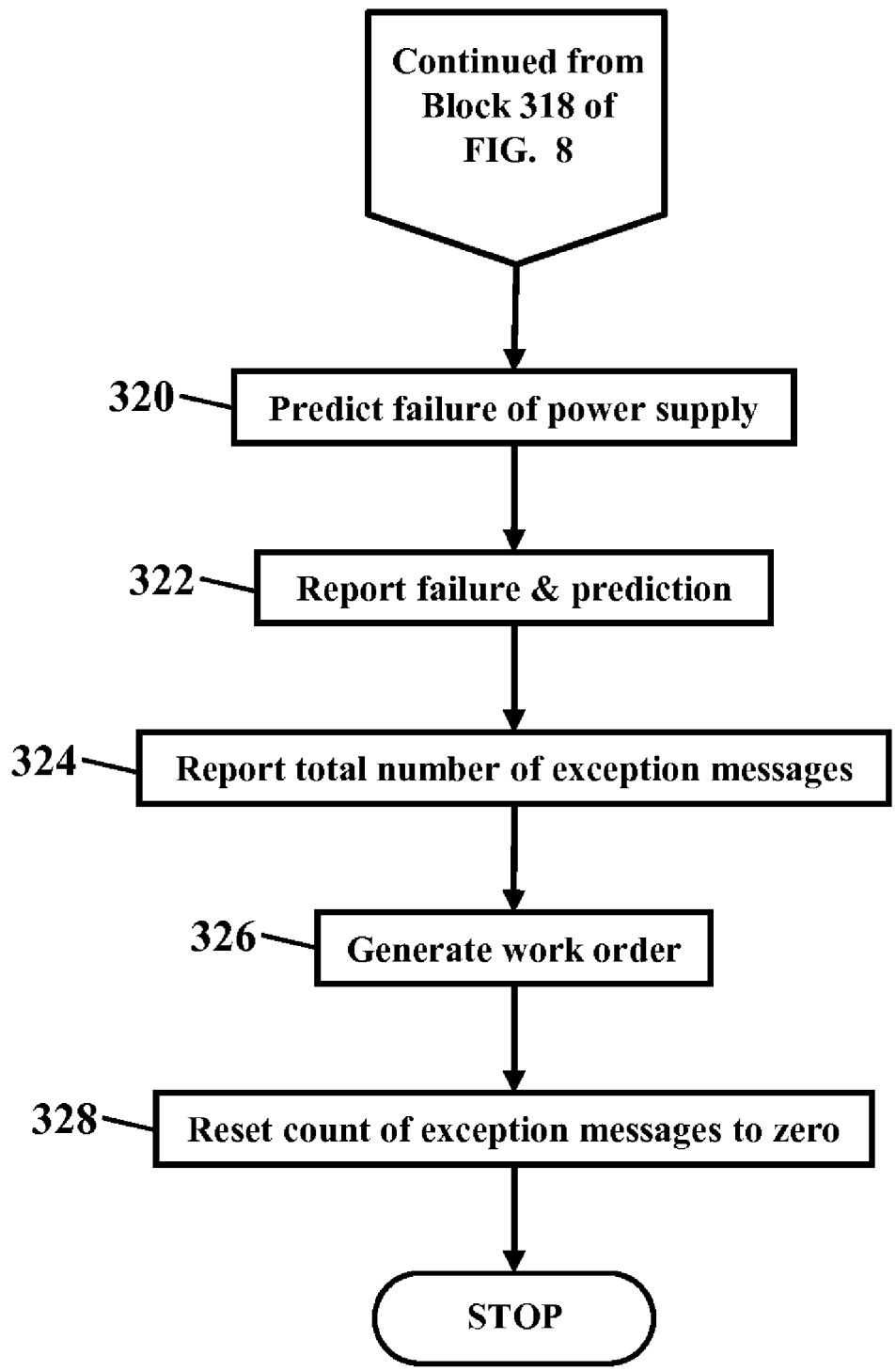

FIGS. 8 and 9 are more detailed flowcharts illustrating the method of predicting failures in power supplies, according to exemplary embodiments. A count of exception messages is established at a value of zero (Block 300). A total number of exception messages is established at a value of zero (Block 302). A threshold value (Block 304) and a period of time is established (Block 306). An exception message is received and time stamped (Block 308). The total number of exception messages is incremented (Block 310). The count of exception messages is incremented (Block 312) and compared to a threshold value (Block 314). When the count of exception messages is equal to the threshold value (Block 316), then an inference is made that a cooling fan has failed (Block 318).

The flowchart continues with FIG. 9. A prediction is made that a power supply is proceeding toward failure (Block 320). The failure of the cooling fan and the prediction is reported (Block 322). The total number of exception messages is reported (Block 324). A work order may be generated to replace the power supply and/or the cooling fan (Block 326). The count of exception messages is reset to the value of zero (Block 328).

Figure 10:
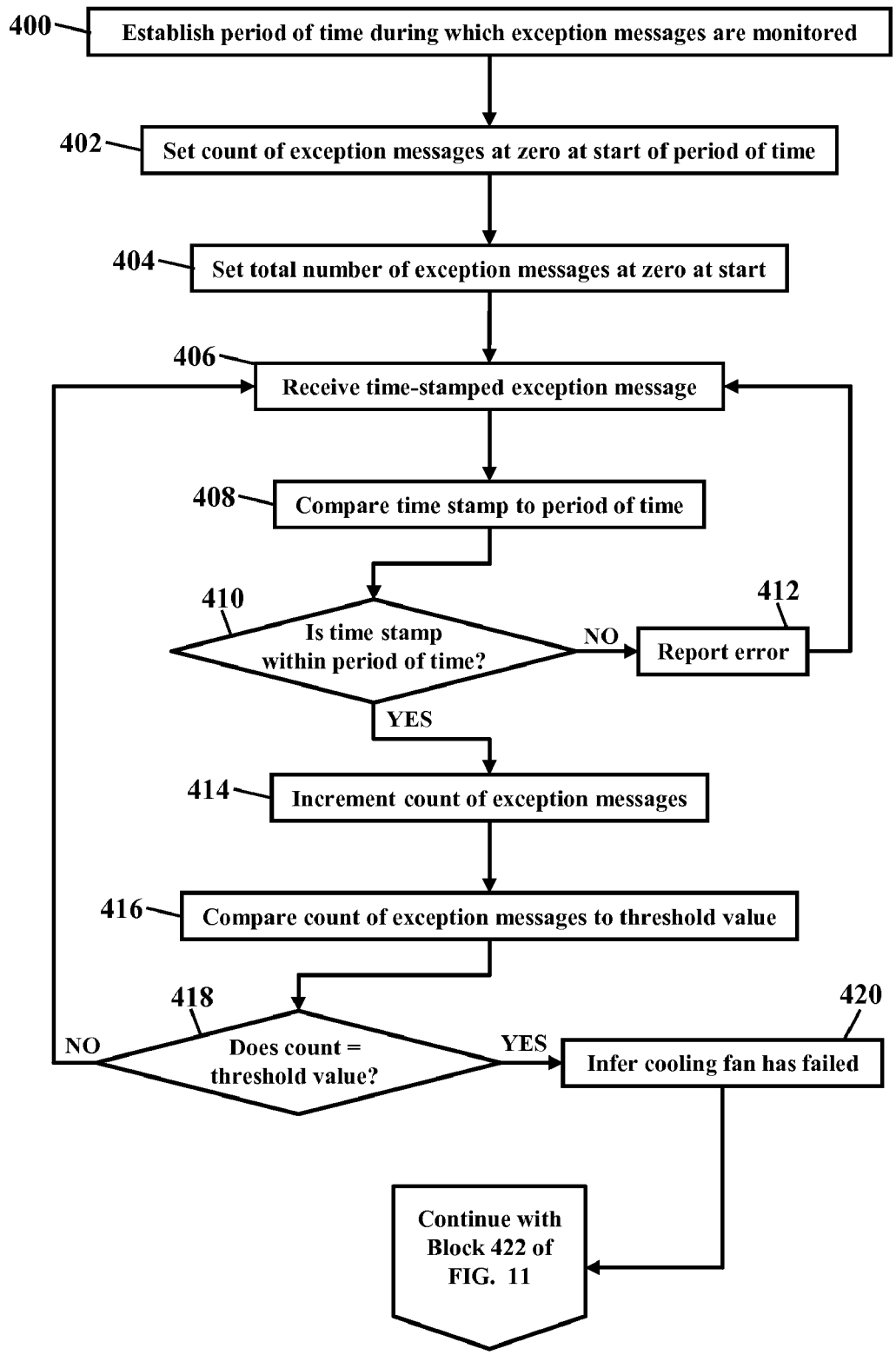
Figure 11:
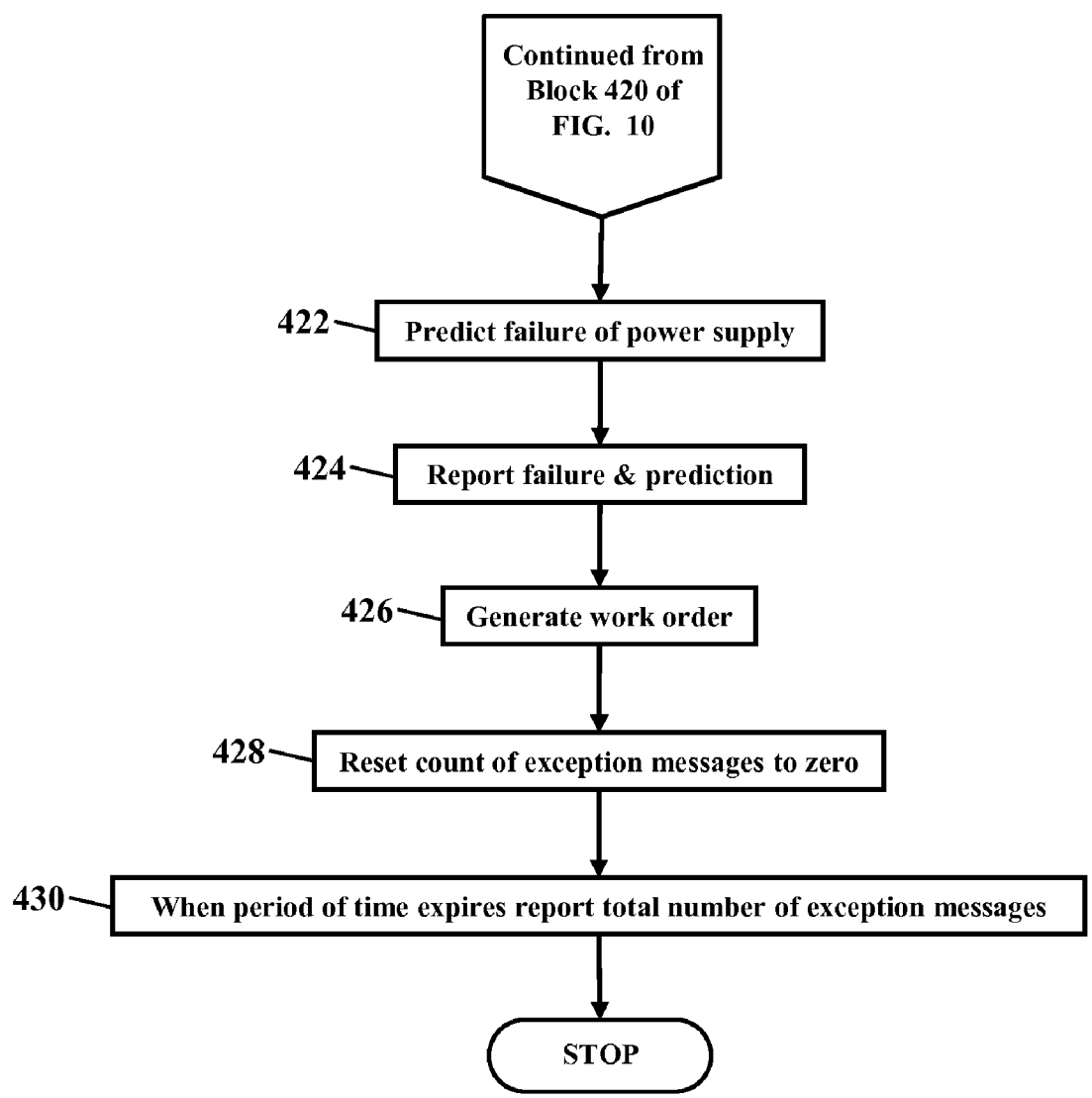

FIGS. 10 and 11 are more detailed flowcharts illustrating the method of predicting failures in power supplies, according to exemplary embodiments. A period of time is established during which exception messages are monitored (Block 400). The count of exception messages is set to zero at a start of the period of time (Block 402). The total number of exception messages is set to zero at the start of the period of time (Block 404). An exception message is received indicating a voltage associated with a power supply in a communications switch is high or low (Block 406). A date and time stamp associated with the exception message is received and compared to the period of time (Block 408). If the date and time stamp is outside the period of time (Block 410), then report an erroneous time stamp (Block 412). If the date and time stamp is within the period of time (Block 410), the count of exception messages is incremented (Block 414) and compared to the threshold value (Block 416). When the count of exception messages equals the threshold value (Block 418), an inference is made that a cooling fan has failed (Block 420).

The flowchart continues with FIG. 11. A prediction is made that the power supply is proceeding toward failure (Block 422). The failure of the cooling fan and/or the prediction is reported (Block 424). A work order may be generated to replace the power supply and/or the cooling fan (Block 426). The count of exception messages is reset to the value of zero (Block 428). When the period of time expires, the total number of exception messages is reported (Block 430).

Exemplary embodiments may be incorporated into other processor-controlled devices. Even though the communications switch 80 is shown and discussed, the failure prediction application 50 may operate in any processor-controlled device. The system 20, for example, may be a personal digital assistant (PDA), a Global Positioning System (GPS) device, an interactive television, an Internet Protocol (IP) phone, a pager, a cellular/satellite phone, or any computer system and/or communications device utilizing a digital signal processor (DSP) and/or the power supply 22. The system 20 may also include watches, radios, vehicle electronics, clocks, printers, gateways, and other apparatuses and systems.

Exemplary embodiments may be applied to any network and/or networking environment. The failure prediction application 50, for example, may operate in a telephony or data network that uses metallic cables or wires. The failure prediction application 50, though, may operate in a cable network operating in the radio-frequency domain and/or the Internet Protocol (IP) domain. The network, however, may also include fiber optic lines and/or hybrid-coaxial lines. The network may even include wireless portions utilizing any portion of the electromagnetic spectrum and any signaling standard (such as the I.E.E.E. 802 family of standards, GSM/CDMA/TDMA or any cellular standard, and/or the ISM band). The network may even include powerline portions, in which signals are communicated via electrical wiring. Exemplary embodiments may be applied to any wireless/wireline communications network, regardless of physical componentry, physical configuration, or communications standard(s).

Exemplary embodiments may be physically embodied on or in a computer-readable storage medium. This computer-readable medium may include CD-ROM, DVD, tape, cassette, disk, memory card, and large-capacity disk. The computer-readable medium, or media, could be distributed to end-users, licensees, and assignees. A computer program product for predicting failures in power supplies comprises the computer-readable medium and processor-readable instructions, as the above paragraphs explained.

While exemplary embodiments have been described with respect to various features, aspects, and embodiments, those skilled and unskilled in the art will recognize exemplary embodiments are not so limited. Other variations, modifications, and alternative embodiments may be made without departing from the spirit and scope of the claims.

What is claimed is:

1. A method of predicting failures, comprising:
   receiving a single exception message indicating a voltage on a bus is at least one of high and low;
   inferring from the single exception message that a cooling fan has failed; and
   predicting a power supply is proceeding toward failure that is cooled by the cooling fan.

2. The method according to claim 1, further comprising generating a work order to replace the power supply.

3. The method according to claim 1, further comprising reporting the failure of the cooling fan associated with the power supply.

4. The method according to claim 3, further comprising generating a work order to replace the cooling fan associated with the power supply.

5. The method according to claim 1, further comprising receiving a time stamp associated with the exception message.

6. The method according to claim 1, further comprising establishing a period of time.

7. The method according to claim 6, further comprising tallying a total number of exception messages occurring during the period of time.

8. The method according to claim 1, further comprising reporting the prediction.

9. A system for predicting failures, comprising:
   a processor executing code stored in memory that causes the processor to:
   establish a period of time during which exception messages are monitored;
   set a count of exception messages at zero at a start of the period of time;
   set a total number of exception messages at zero at the start of the period of time;
   receive an exception low voltage message indicating a voltage on a bus associated with a power supply in a communications switch is lower than a minimum value;
   increment the count of exception messages when the exception low voltage message is received during the period of time;
   compare the count of exception messages to a threshold value;
   receive an output signal from a photocell;
   infer a cooling fan has failed when the count of exception messages equals the threshold value and when the output signal from the photocell is a constant value;
   predict the power supply is proceeding toward failure when the count of exception messages equals the threshold value and when the output signal from the photocell is the constant value; and
   report the total number of exception messages when the period of time expires.

10. The system according to claim 9, further comprising code that causes the processor to generate a work order to replace the power supply.

11. The system according to claim 9, further comprising code that causes the processor to report the failure of the cooling fan associated with the power supply.

12. The system according to claim 11, further comprising code that causes the processor to generating a work order to replace the cooling fan associated with the power supply.

13. The system according to claim 9, further comprising code that causes the processor to receive a time stamp associated with the exception low voltage message.

14. The system according to claim 9, further comprising code that causes the processor to reset the count of exception messages at zero when the count of exception messages equals the threshold value.

15. A computer readable medium storing processor-executable code for performing a method of predicting failures in a power supply, comprising
   establishing a period of time during which exception messages are monitored;
   setting a count of exception messages at zero at a start of the period of time;
   setting a total number of exception messages at zero at the start of the period of time;

receiving a exception message indicating a voltage on a bus produced by the power supply in a communications switch is at least one of high and low;

incrementing the count of exception messages when a exception message is received during the period of time;

comparing the count of exception messages to a threshold value;

receiving an output signal from a photocell;

inferring a cooling fan has failed when the count of exception messages equals the threshold value and when the output signal from the photocell is a constant value;

predicting the power supply is proceeding toward failure when the count of exception messages equals the threshold value and when the output signal from the photocell is the constant value; and reporting the total number of exception messages when the period of time expires.

16. The computer readable medium according to claim 15, further comprising code for generating a work order to replace the power supply.

17. The computer readable medium according to claim 15, further comprising code for reporting the failure of the cooling fan associated with the power supply.

18. The computer readable medium according to claim 17, further comprising code for generating a work order to replace the cooling fan associated with the power supply.

19. The computer readable medium according to claim 15, further comprising code for receiving a time stamp associated with the exception message.

20. The computer readable medium according to claim 15, further comprising code for resetting the count of exception messages at zero when the count of exception messages equals the threshold value.

* * * * *